Dec. 12, 1967   G. P. HOLMES ETAL   3,357,550
COMBINATION REEL AND LABEL FOR SURGICAL SUTURES
Filed June 23, 1966   3 Sheets-Sheet 1

INVENTORS.
GERARD PAUL HOLMES
JOHN WILLIAM MURPHY
BY
Samuel Brandt Walter
ATTORNEY Dec. 12, 1967  G. P. HOLMES ETAL  3,357,550
COMBINATION REEL AND LABEL FOR SURGICAL SUTURES
Filed June 23, 1966  3 Sheets-Sheet 2
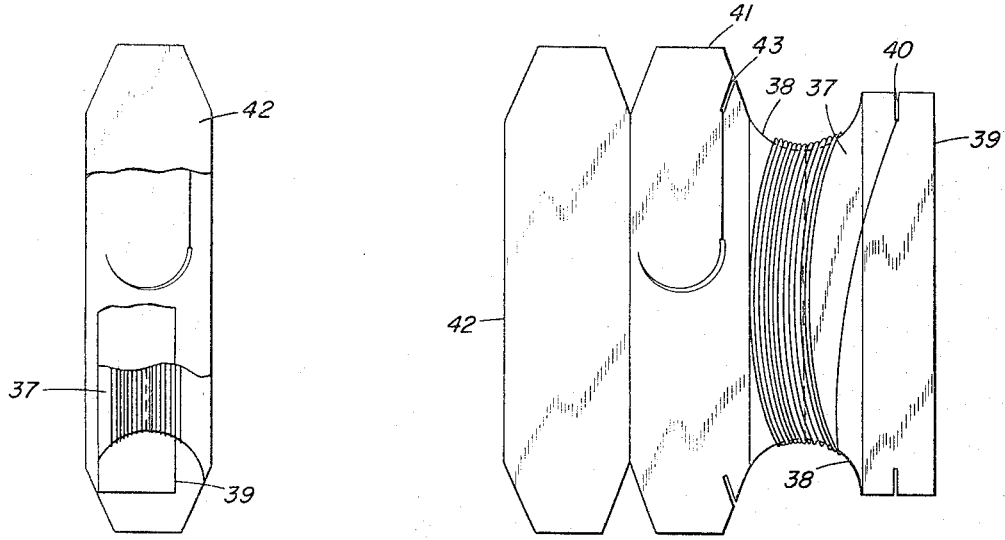
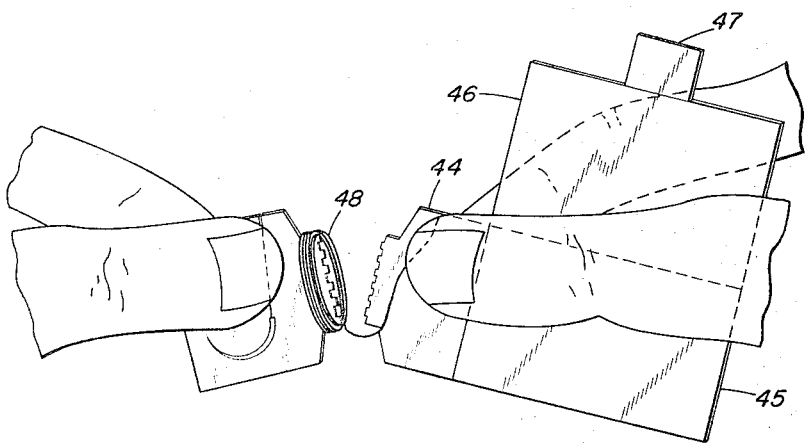
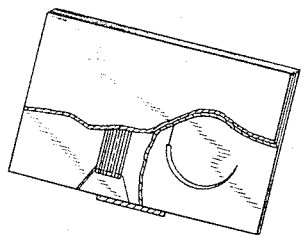
INVENTORS.
GERARD PAUL HOLMES
JOHN WILLIAM MURPHY
BY
ATTORNEY Dec. 12, 1967   G. P. HOLMES ET AL   3,357,550
COMBINATION REEL AND LABEL FOR SURGICAL SUTURES
Filed June 23, 1966   3 Sheets-Sheet 3
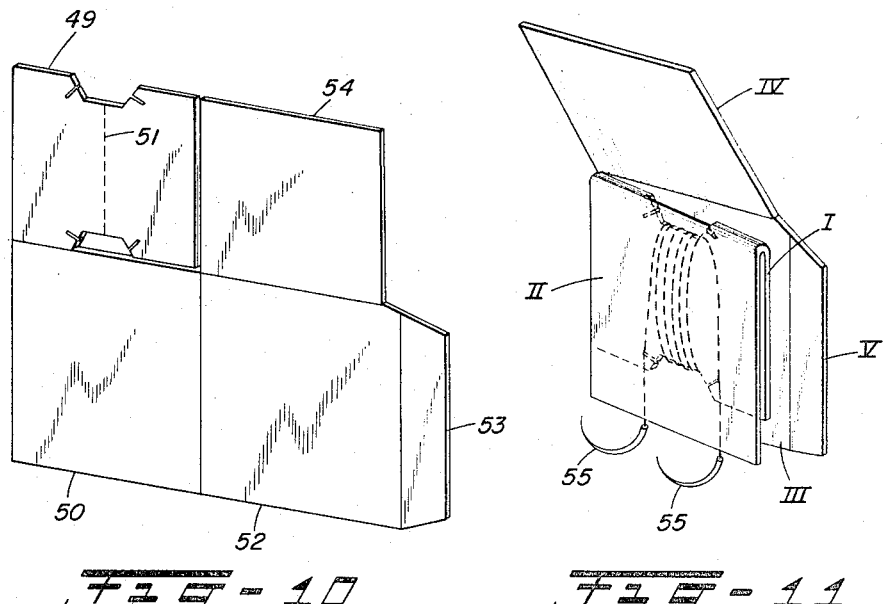
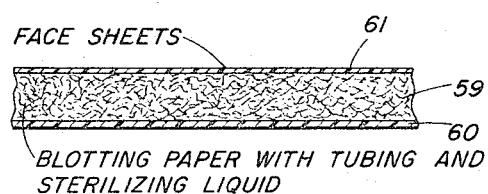
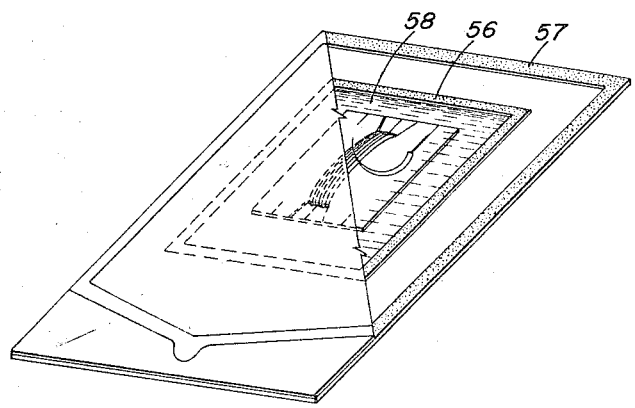
INVENTORS.
GERARD PAUL HOLMES
JOHN WILLIAM MURPHY
BY
ATTORNEY United States Patent Office 3,357,550
Patented Dec. 12, 1967

3,357,550
COMBINATION REEL AND LABEL FOR
SURGICAL SUTURES
Gerard Paul Holmes, New Fairfield, and John William
Murphy, Ridgefield, Conn., assignors to American
Cyanamid Company, Stamford, Conn., a corporation
of Maine
Filed June 23, 1966, Ser. No. 559,818
10 Claims. (Cl. 206—63.3)

ABSTRACT OF THE DISCLOSURE

Surgical sutures or ligatures are wound on a stiff sheet reel-label which has two notches on opposed edges with a line of weakness between and connecting the bases of the notches to permit ready separation of the reel-label into two portions on said line of weakness. The ligature or suture is wound in these notches with a separate end holding slit in what is to become each of the portions, which fixes and holds the ends so that at time of use the reel-label is torn into two portions and the ligature or suture is straightened out with the two portions forming end holding handles for the suture or ligature.

This invention relates to a combination reel and label holding a surgical suture, which reel-label is of a relatively stiff sheet material, having two suture-winding notches in opposed edges thereof with a line of weakness between the notches, along which the reel-label can be separated releasing the suture from the notches; each of the two parts thus formed has at least one slot therein in which an end of the suture is wedged whereby in pulling the two parts apart the suture is stretched out without tangling. Optional features of preferred embodiments include hinged panels attached to the principal portion of the reel on which information may be printed to identify the suture, and which fold over and protect the suture and any needles thereon from damage or contamination; and part or all of the reel and associated panels may be of a liquid absorbing material or have a liquid absorbing layer so that a sterilizing liquid or conditioning liquid may be absorbed in the label thus minimizing the amount of free liquid which is in an envelope in which the suture containing reel-label is packaged.

As used herein the term sutures includes ligatures. Ligatures technically are used without a needle for tying, whereas sutures are used with a needle for penetration of tissues as well as tying. The same material can be used for both purposes and frequently parts of the same strand are actually used as both a suture and a ligature depending upon the requirements of the surgeon at a particular time during a surgical procedure.

The sutures may have a needle on one or both ends. Frequently a needle is placed on each end so that the suture is cut and each needle used separately, and sometimes each needle is used for penetration for particular tissues at a particular time. Conveniently the needles are of the eyeless type that is permanently attached to the end of the suture and designed for but a single use. Such needles cause less trauma to tissues in which they are used and are becoming surgically preferred.

The sutures may be of collagen, either natural catgut or regenerated collagen. Such sutures are usually packed in a conditioning liquid such as a mixture of one or more alcohols in water so that the collagen will have a preferred flexibility and are designated as absorbable sutures. Nonabsorbable sutures may also be packed on the present reel-label. Such sutures are usually packed dry and may be of such classical materials as silk, usually with a silicone or wax coating, or of cotton or linen, or of one of the newer synthetic materials such as nylon, polyester, isotactic polypropylene, or linear polyethylene, metal wire, such as stainless steel, either insulated or bare, or the suture may be of such other composition as preferred by the surgeon for the surgical procedure is progress.

Typical of packages meeting with commercial acceptance today is that shown in U.S. Patent 2,949,181, G. S. Buccino, "Suture Package and Process of Making Same" Aug. 16, 1960, which shows a double envelope, the outer of which at least is strippable, with the suture dry or wet packed in the inner envelope. The suture is shown as folded in a label.

The reel-label suture may be packed in three envelopes, to permit double preparation, as shown in U.S. Patent 3,202,273 "Suture Package for Serving Sutures Sterile Twice" C. T. Riall, Aug. 24, 1965. Other sutures have been dry packed. U.S. Patent 2,692,676, P. W. Grover, "Suture Needle Package" Oct. 26, 1954 shows a parallel multiple threaded needle holder for sutures, in which the needles and sutures are in parallel relationship in a long paper holder, each being retained in slits in offsets in the paper. Older types of reels have been used with glass tubes containing absorbable sutures. U.S. Patent 2,417,574, E. Themak, "Suture Package" Mar. 18, 1947, discloses a folding suture reel blank, having notches in which the suture is wound, with the blank being folded about a lengthwise axis to fit into a glass suture tube. U.S. Patent 1,887,529, E. Themak, "Ligature Package" Nov. 15, 1932, discloses a notched holder, essentially plane, in the notches of which the ligature is wound, with a data tab on the holder.

It has now been found that it is advantageous to package sutures in a strippable envelope of the type shown in the Buccino patent, supra, but which suture is wound on a reel so that it may be handled more easily. This reel is of separable construction so that the reel itself is sufficiently stiff to hold the suture during manufacture, packaging and shipment, but the reel may be separated into two parts readily at time of use with one end of the suture attached to each part so that as the reel is separated, the suture is released and may be straightened out without tangling and with the minimum risk of contact with foreign bodies or contamination. Each end of the suture is separately fastened in a slit in one of the separate parts formed as the reel is torn into two parts. The reel may have indicia printed on the face of the reel itself to indicate the source, lot number, type, size, length and other characteristics. Frequently it is more convenient to have a separate panel, with such information printed thereon, which folds with respect to the reel itself. By such folding the suture is given additional protection in packaging and in releasing from the package. The panels may be folded so that the needles on the end of the suture are visible for inspection through transparent envelopes in which the suture is packed. Also, more than one folding panel may be used so that the suture is well protected in the outer envelope and the envelope may be opened under conditions which compromise sterility, but the unfolding of the panels from the reel insures that no contamination is transferred to the suture.

Frequently it is found that the user of the sutures is sufficiently familiar with size and type to be able to immediately identify the standard size and type from a label. Needles are not nearly as well standardized and accordingly the operating room nurse or surgeon may wish to inspect the needle through the envelope to determine if the arc of curvature, radius of curvature, type of point, type of cutting edge, and other characteristics are satisfactory for a particular procedure. If the needles on the suture are different, both may be packed so as to be visible.

If the needles are the same or if but one needle is used, but one needle need be visible.

The reel-label itself is preferably of label paper which is manufactured for such purposes and is a special sterilization paper designed for either letterpress or offset printing. A paper with a 90 lb. basis weight and designed to withstand heat, steam or gas sterilization without discoloring, and which accepts alcohol and water-insoluble ink is satisfactory. One such paper is a special sterilization paper, sterile offset type, sold by Pittsburgh Paper Company. Other paper suppliers have such specialty types of paper in their stocks. The ink-paper combination should not bleed or discolor under conditions of use.

Whereas it is usually cheapest to use such paper with cut-out notches and a partly scored line of weakness, the present reels can be made from two pieces of paper which are adhered together with a glue line that will fracture readily, or the reel may be manufactured from plastic, or wood fiber board, or other material which is resistant to the sterilizing process contemplated and environmental conditions which will be met with between the time of packaging and in the time of ultimate use. Whether joined by an adhesive, a mechanical or a scored zone of weakness, each of the two portions has at least one slit for an end of the suture, so that when the reel is separated into two pieces, the suture may be stretched out. Usually it is more convenient to have a separate slit in each portion at both the top and bottom, in order that a slit will be close to each end of the suture no matter how the suture is wound on the reel.

In winding the suture on the reel, it is desirable that the suture be loosely wound so that the suture does not have different curvature at different portions. If the suture is of metal, a sharp curvature can permanently kink the wire; if of catgut, the catgut is given a permanent set so that the suture when unwound is uneven and exhibits the characteristics of winding. For that reason it is preferred that the suture be wound loosely on the reel so that the suture has approximately the same radius of curvature at all parts, and then the loosely wound suture is turned so that the plane of the suture is turned towards the plane of the reel and lies flat against the reel. By being so turned the suture has all of the advantages of being packed in a coil in an envelope and at the same time has all of the advantages of being wound on a reel for control of the suture when the reel is removed from the package. Particularly if of silk or cotton the suture is more limber and may be more tightly wound on the reel.

Particularly if protected with two or more folding panels, it is possible for the reel-label with the folding panels to furnish major protection for the suture against contamination, and use but a single envelope. Usually, however, a double envelope at least is preferred with the outer envelope of the strippable type, to be stripped to discharge the sterile inner envelope, which contains the suture sterilely on the inside, so that the suture is maintained in a sterile environment until time for use during an operating procedure.

Either the inner or the outer envelope may be of a plastic or a plastic and metal foil laminate or a plastic laminate which has characteristics adapted to the storage of the sutures packed therein. For sutures which are packed in a tubing fluid consisting of alcohol and water, the envelope must be of a material which is relatively impermeable to such a fluid. For dry packed sutures, the requirements are less rigorous.

It is a particular feature of the present reel-label that the reel with associated attached hinged panels may be of a paper which is inherently of absorbable type or is a laminate which has an absorbable layer, as for example a single or double faced blotting paper. This permits either adding a liquid into the envelope containing the suture wound on the reel or impregnating the reel with a suitable liquid before the wound suture is placed in the envelope.

Under either conditions after sealing, the absorbable material will absorb the liquid which would otherwise be free in the envelope, and give the advantages of a substantially dry envelope, while still having a conditioning liquid on the inside. The absorbed conditioning liquid can be an alcohol-water composition, such as about 90% ethanol and 10% water, which is sometimes used for conditioning collagen sutures, or may be a mixture of ethyl alcohol, isopropyl alcohol and water, or such other alcohol, water and conditioning agents as may be desired. Additionally, the conditioning liquid may have dissolved therein sufficient of a sterilizing gas so that the suture, the label, and the contents of the envelope are sterilized by the action of the sterilizing gas, such ethylene or propylene oxide on storage after manufacture, but prior to use. Such sterilizing gases as ethylene oxide and propylene oxide react on aging so that the suture may be packed with a sterilizing gas during the normal shipping procedures prior to time of use, the ethylene or propylene oxide will have disappeared leaving a suture which is in a suitable tubing-fluid and ready for use.

If the suture is to be of the dry packed type, the ethylene oxide in a suitable carrier, usually more concentrated, may be absorbed into the label at the time of packaging.

The advantages of having all tubing fluid absorbed by the reel-label are two-fold, in that first if there is no free liquid, the liquid cannot flow and transfer contaminants, as is the case when free tubing fluid is present. Additionally, the quantity and characteristics of the tubing fluid are readily controlled. The tubing fluid may be used with a higher concentration of water and in less quantities to give the same effective degree of hydration to collagenous sutures, if desired.

Other advantages of the present reel-label and package for sutures are apparent from a study of the accompanying figures and specific examples which follow:

FIGURE 6 shows a reel-label having the holding slits in a folding panel, with a single panel on one side, and a double panel on the other, as folded for packing, partially broken away.

FIGURE 7 shows the same reel-label as FIGURE 6 but unfolded.

FIGURE 8 shows double side fold protective panels on a reel-label, in folded form, partially broken away.

FIGURE 9 shows the reel-label of FIGURE 8, but unfolded.

FIGURE 10 shows a reel-label with four protective folding panels.

FIGURE 11 shows the same label as FIGURE 10, with a double armed suture, partially folded.

FIGURE 12 shows the reel-label with a suture thereon packaged in a strippable outer envelope, and a conditioning liquid in an inner envelope, partially broken away.

FIGURE 13 shows an enlarged cross section of a blotting paper to absorb conditioning liquid, without free liquid being released on opening.

Figure 2:
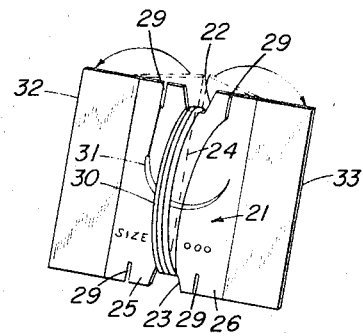
FIGURE 2 shows an unfolded reel-label, having a suture thereon.

As shown in FIGURE 2, basically the reel-label consists of a reel 21 of stiff sheet material; preferably but not necessarily of approximately rectangular shape. In the top and bottom edges of the reel itself are a top suture winding notch 22 and a bottom suture winding notch 23. Conveniently but not necessarily these notches have a wedged shaped entry, and a bottom which is flat to permit easier winding. Between these two suture winding notches is a line of weakness 24. The line of weakness may be, as shown in FIGURE 2, a dotted line in which the dots or dashes sever the reel itself into segments along the length of the line of weakness, for easy parting, or the line of weakness may be a line partly cut through the reel along its entire length, or the sheet material may be weakened by mechanical folding. Usually in the cutting out or printing operations a line of dashes is formed, or a score line, as the line of weakness, so that the reel may be separated into two parts along this line.

For purposes of convenience, the reel is described as consisting of a first portion 25, and a second portion 26. After tearing along the line of weakness, these two portions form a first part 27 and a second part 28. Each portion has associated therewith suture holding slits 29.

Conveniently and usually the slits are formed in the two portions of the reel itself, although the slits may be formed in hinged panels attached to the portions of the reel. The slits are cut by scissors, or a knife during a shaping operation, using conventional cut-out techniques. The slits have no appreciable width but are merely cut as with a scissors or knife and conveniently are about a quarter to three-eighths of an inch long, although this length is not critical, and may vary depending upon proportions, and choices of the user. Although one slit in each portion of the reel is sufficient to hold the respective ends of the suture, it is usually more convenient to form a slit in both the top and bottom edges of each of the two portions of the reel so that if the suture is of such length that in winding as the end comes nearer the top or bottom slit, the end may be wedged in the slit which is closest.

On the reel is wrapped a suture 30. The suture may be of any preferred suture material and of any desired size. Preferably, but not necessarily, to at least one end of the suture is attached an eyeless needle 31. Eyed needles may be used, but the eyeless needle is usually preferred by the surgeon as it causes less tissue damage. The surgical needle may be curved, or straight, and of any shape or size preferred for use with a particular suture for a particular surgical technique.

In use, a first end of the suture is wedged in one of the suture holding slits in one portion of the reel, and then the suture is wound in the suture winding notches, after which the other end of the suture is inserted in a suture holding slit in the other portion of the reel. The needle may be the first portion wedged, or the last portion wedged, or a surgical needle may be placed on each end of the suture so that there are in fact two needles on the suture. The needles may be the same or different depending upon a surgeon's choice.

As shown in FIGURE 2 the suture is preferably wound somewhat loosely in the notches. If the suture is of silk or cotton or polyfilamentary, and not easily set, the suture may be wound fairly close to the reel. For collagen sutures, wire sutures, or monofilament polymeric sutures, the suture is more apt to take a permanent set if bent sharply, and accordingly the suture is wound loosely about the notches in an almost circular configuration. The plane of the suture can be twisted towards the plane of the reel so that one group of loops of the suture is adjacent the first portion of the reel on one face of the reel, and the other is opposite the other portion of the reel on the other face of the reel. In this fashion a nearly circular wind may be readily accomplished, and yet the suture is essentially as flat as the label, after the suture is twisted into the plane of the label.

Figure 3:
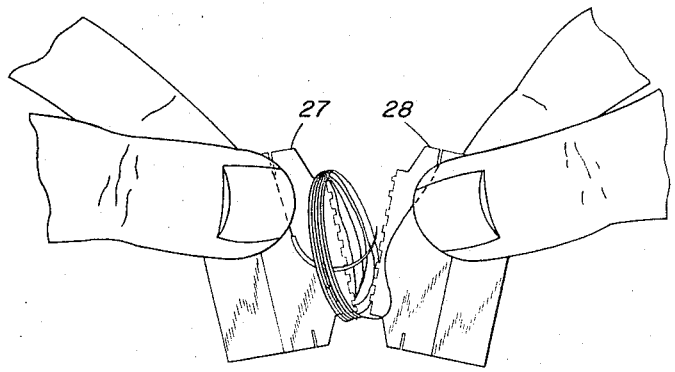
FIGURE 3 shows dividing a reel-label into two parts on the tear line.
Figure 4:
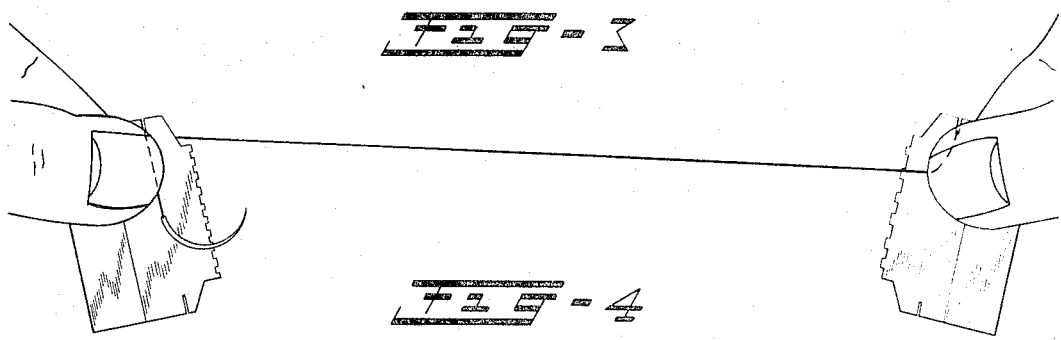
FIGURE 4 shows stretching out of a suture while the ends thereof are retained in holding slits.

At the time of use, the reel is held in two hands by the user, preferably with thumb and one finger grasping each end of the suture adjacent to a slit, or held at the slit, in each portion of the reel, and the reel is separated along the line of weakness into two parts. This operation is shown in FIGURE 3.

After the reel is separated into two parts, the two parts are drawn apart by moving the hands away from each other to straighten out and stretch the suture. The ends of the suture are still retained in the suture holding slits and hence the two parts of the reel serve as convenient handles for holding and controlling the suture. Even if the suture is an extremely fine one, the portions of the reel are easily seen and the location of the suture readily determined. A needle associated with either or both ends of the suture is left lying against that part of the reel with which it was first associated; preferably without pulling on the needle. No matter how well attached a suture may be to a needle, there is always the possibility of pulling a suture out of the needle and accordingly it is preferable to handle the suture, rather than use the needle, in drawing the suture out straight after splitting the reel into two parts by tearing at the line of weakness.

Preferably foldably attached to the main portion of the reel are hinged panels. As shown in FIGURE 2 a first hinged panel 32 is attached to the first portion of the reel and a second hinged panel 33 is attached to the second portion of the reel. Conveniently these panels are part of the original sheet from which the reel is cut. For convenience in assembling, a crimp line or score line is pressed into the sheet material from which the assembly is manufactured, so that the hinged panels may be more easily bent. Conventional paper or cardboard folding techniques are used for forming the hinged line on which the hinged panels are folded. Conveniently, but not necessarily, as shown in FIGURE 2 the first hinged panel and the second hinged panel each are folded toward the same face of the reel so as to protect one face of the suture assembly thereon, and assist in retaining the suture in position during assembling, packaging and opening operations.

The assembly may be put in envelopes or handled during manufacturing operations or at time of use very readily without the reel and suture becoming disengaged or tangled. The eyeless needle is conveniently placed under the turns of suture on the side away from the hinged panels so that the needle continues to be visible after the hinged panels are folded against the face of the reel.

Either or both faces of the reel and the hinged panels or both may be printed with suitable identifying and advertising indicia, to completely identify the suture, its size, its length, its type and treatment, the needle as to size and length, a manufacturing lot number, and of course the brand name of the manufacturer. As the reel itself may serve as a reel and a label, it is referred to as a reel-label for convenience.

Figure 1:
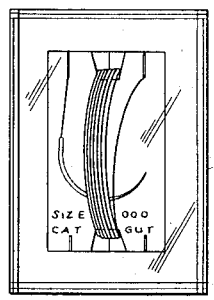
FIGURE 1 shows a needled suture dry packed on a reel-label in a transparent envelope.

One of the reel-labels having a suture thereon and the hinged panels folded against one face thereof is shown in a transparent envelope 34 in FIGURE 1. This envelope may be of conventional type of polyethylene or a polyester type such as "Mylar"; or a laminate. As shown in FIGURE 1 such a package when sealed is ready for use. As shown in FIGURE 1, the suture on its reel may be dry packed. A dry package is frequently used for silk, linen, cotton or synthetic polymer sutures. Synthetic polymers such as linear polyethylene and isotactic polypropylene are conveniently used as a monofilament and should not be bent sharply. Silk and cotton may be bent sharply without damage.

Figure 5:
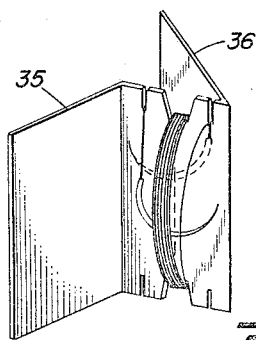
FIGURE 5 shows a double armed suture on a reel-label having hinged panels protecting both faces.

Another modification is shown in FIGURE 5 in which a front hinged panel 35 and a rear hinged panel 36 are hingeably attached to the two portions of the reel, and are each folded into contact with separate faces of the reel, so that both faces are protected during packaging. This modification is extremely handy in furnishing slightly larger panels for handling the suture, but does have the minor disadvantage that the needle itself may not be visible. Hence if a transparent envelope is used, the surgeon is not able to look at the needle and be certain that it is the one that he desires; instead he must depend entirely on the information printed on the surfaces of the reel and hinged panels.

FIGURE 7 shows a modification in which the reel 37 is narrow and has curved notches 38. First hinged panel 39 has a slit for holding one end of the suture and is folded against the face of the reel. On the other side of the reel is attached a double hinged panel, the second panel 41 being hinged to the reel and a third panel 42 being hinged to the second. The second panel has a slit 43 for holding one end of the suture and conveniently the needled end of the suture is placed in the second panel so that after the first panel is folded against the face of the reel, the second panel is folded over against the first with the needles being between the two panels. Then the third panel is folded on the back side of the reel thus protecting both sides of the suture on the reel. This configuration is particularly advantageous with cutting edge needles where the edge of the needle itself could cut the suture during shipment as it would be pressed against the suture. The assembly folded together is shown in FIGURE 6.

The second and third hinged panels are slightly longer than the reel and the first hinged panel, so that when placed in an inner envelope the suture is held nearer the middle of the envelope and if the envelope is cut or torn, part of the end of the second and third panels may be cut or torn without risk of damage to the suture.

In FIGURE 9 is shown a reel with three panels. To the reel 44 is foldably hinged a first hinged panel 45 and to the side of the first hinged panel is attached a second hinged panel 46 to which is attached a third hinged panel or tab 47. When the suture 48 is wound on the reel, the first hinged panel folds over against the face of the reel and then the second hinged panel folds laterally above the reel so as to protect both faces and then the tab folds over against the back of the first hinged panel to give a full wrap as shown in FIGURE 8. As shown in FIGURE 8, the needle is offset on the face of the reel from the suture so that there is no risk of the suture being cut by the needle.

In FIGURES 10 and 11 is shown a modification in which the reel itself 49 is as previously described. To a part of one end of the reel is attached a first hinged panel 50 designed to fold perpendicularly to the line of weakness 51. A second hinged panel 52 is attached to the side of the first hinged panel with a tab 53 hinged parallel to the hinge between the first hinged panel and the second hinged panel and a third hinged panel 54 is attached at the side. In this configuration after the suture is wound on the reel, the first hinged panel is folded against the reel, the surgical needles 55 are permitted to hang out, and the second hinged panel folded against the other face of the reel after which the third hinged panel is folded against the back of the first and the tab is used to close the assembly. The surgical needles may be protected between the third and first hinged panels or they may be left outside so as to be visible through a transparent envelope to a user. This configuration is particularly useful in techniques where the suture envelope is to be opened under conditions which might compromise sterility and the suture is to be unfolded in the reel. In the unfolding the suture hangs sterilely from a sterile reel and can be disengaged and taken therefrom by a surgeon without question of loss of sterility, even though certain of the panels are held by persons or instruments the sterility of which has been compromised. This form of fold is particularly convenient for office use by a surgeon who wishes to use a single suture for a minor procedure and wishes to cut open the envelope containing the suture and have the suture ready for use by picking up with sterile forceps without the intervention of the sterile operating room personnel. One pair of forceps may be used to unfold and release the suture and sterile needle forceps used to pick up the needle, disengage and use the suture, without compromise of sterility other than of the first forceps used to pick up the suture folded in the reel-label.

Shown in FIGURE 12 is a reel-label assembly with the needle exposed in an inner protective envelope 56 in a strippable outer envelope 57. Such envelopes are shown in the patent to Riall 3,202,273, supra. Also in the inner protective envelope 56 is a conditioning liquid 58 which may be either an alcohol-water tubing fluid, of the types conventionally used, or such a fluid additionally containing ethylene oxide to sterilize the suture.

The quantity of conditioning liquid and the type of conditioning liquid, whether to sterilize or to condition the suture, or both, is in accordance with conventional practice.

As shown in FIGURE 13 is a portion of an enlargement of the section of a sheet which may be used for any of the present reel-labels in which an absorbent paper 59 such as blotting paper is faced on each side with a face sheet 60 and 61 which give the rigidity and handleability desired for the reel, and which are sufficiently porous to give slow absorption and release of liquids absorbed on the absorbent paper layer 59. These face sheets may be separately adhered to the absorbent layer or may be calendered on the surface of the absorbent paper itself. Any of the above reels may be cut from such a stock and after the sutures are wound thereon the reel may be dipped in a conditioning liquid, and then placed in an envelope and sealed. A small portion, for instance 2 ml., of conditioning liquid may be placed in the envelope and the reel-label with suture thereon is placed in the envelope and the envelope sealed, after which the absorbent layer absorbs the liquid from the interior of the envelope, so that there is no free liquid visible or apparent. Equilibrium conditions are established in which the suture is in contact with the conditioning liquid, so as to maintain the desired flexibility of the suture. The conditioning liquid may also act as a sterilizing agent if it contains ethylene oxide. Thus ethylene oxide or propylene oxide sterilizing procedures may be used on either collagen or non-absorbable sutures.

On opening the envelope, the reel-label appears dry and the suture may be taken therefrom and used without free liquid being apparent.

Free liquid which can flow on the surfaces of envelopes and instruments picks up and carries contaminants along with the liquid and as a result the opening must be under such conditions that any free liquid comes in contact with only sterile surfaces. The use of an absorbent layer so that there is no free liquid permits a label of the type shown in FIGURES 8 or 11 to be used with a collagen suture in a single strippable envelope. As the envelope is stripped, and label removed, the unfolding assures against contamination of the suture. The suture is sterilely released, and only a single envelope is required, thus permitting more economical packaging.

The exact proportions and sizes of the reels, the protective faces, the sizes of sutures, the sizes of needles and the exact shapes may be modified in fashions obvious to those skilled in the art. The above description is to illustrate the present invention. The claims are to limit it.

As will be apparent to those skilled in the art, the envelopes for the suture may be either transparent or non-transparent depending upon whether the surgeon desires to be able to inspect the suture and the needle before use. The film material from which the envelopes are made must be resistant to tubing fluid or other fluids being used for the periods for which the suture may be stored. A single transparent face permits the inspection of the suture.

A strippable seal is the most convenient method of exposing a suture sterilely without risk of contamination, but of course, other types of envelopes may be used with the present reel where suitable precautions are taken to insure that the suture is sterile at the time of use.

We claim:
1. A reel-label holding a surgical suture comprising: a reel of stiff sheet material, at least two suture winding notches in opposed edges thereof, a line of weakness connecting the bases of said notches permitting said reel to be separated into two definite parts along said line of weakness, at least one suture holding slit in that portion of said reel which is to form each of said two parts, whereby a surgical suture wound about the reel and in said notches and having the two ends of the suture each removably fixed in one of said slits in the separable two portions of the reel is pulled apart and stretched as said reel is separated into two parts, and said suture can be and is stretched out, free from tangles, as the sheet material is separated into said two parts, and a surgical suture loosely wound about said reel in said notches, so that the plane of the wind is adjacent the plane of the sheet, so that the radius of curvature of the suture is gradual at all points, with one of the two separate ends of the suture each passing through one of said slits in the separable two portions of said reel.

2. The reel-label-suture of claim 1 comprising, additionally, at least one eyeless surgical needle attached to the suture.

3. The reel-label-suture of claim 2 in which at least one printable hinged panel is foldably attached to an edge of the reel and folded into juxtaposition with the reel, and identifying indicia on said hinge panel, whereby the suture wound on the reel is protected by and identified by said hinge panel.

4. The reel-label-suture of claim 3 in which the reel is essentially rectangular, and a printable hinged panel is foldably attached to each of the two edges of the reel without a notch.

5. The reel-label-suture of claim 4 in which the two hinged panels fold towards the same face of the reel and protect the same, and the suture has at least one surgical needle adjacent the protected face whereby protection is assured for the needle.

6. The reel-label-suture of claim 4 in which the two hinged panels fold towards opposed faces of the reel, thereby separately and independently protecting each face of the reel, and that portion of the suture and attached needle on such face.

7. The reel-label-suture of claim 3 in which a second hinged panel is foldably attached to said first hinged panel each being of such size as to wrap around the reel and protect both faces thereof.

8. The reel-label-suture of claim 3 in which the reel, having a suture thereon, is packaged in at least one strippable envelope.

9. The reel-label-suture of claim 2 in which a printable hinged panel is foldably attached to at least one of the edges of the reel, and folded into juxtaposition with the reel, and the assembly is enclosed in a transparent envelope, through which at least one surgical needle is visible.

10. The reel-label-suture of claim 1 in which the stiff sheet material has a liquid absorbing layer, whereby a treating liquid is incorporated in a strippable envelope, and yet is absorbed by said layer, so as to avoid drippage, and accompanying transfer of contaminants, on opening.

References Cited
UNITED STATES PATENTS 1,610,607    12/1926    Hirsch      206—63.3
2,318,379    5/1943    Davis et al.      206—63.3

FOREIGN PATENTS 340,948    10/1959    Switzerland.

MARTHA L. RICE, *Primary Examiner.*